United States Patent [19]

Brendzel et al.

[11] Patent Number: 5,706,031
[45] Date of Patent: *Jan. 6, 1998

[54] COMPUTING AND TELECOMMUNICATIONS INTERFACE SYSTEM

[75] Inventors: Henry Tzvi Brendzel, Millburn; B. Waring Partridge, III, Far Hills, both of N.J.

[73] Assignee: Lucent Technologies Inc., Murray Hill, N.J.

[*] Notice: The term of this patent shall not extend beyond the expiration date of Pat. No. 5,659,335.

[21] Appl. No.: 339,386

[22] Filed: Nov. 14, 1994

[51] Int. Cl.⁶ .................................................. G09G 5/00
[52] U.S. Cl. .......................... 345/172; 345/157; 345/163; 345/168; 379/284
[58] Field of Search ............................ 345/157, 163, 345/168, 172; 379/76, 284

[56] References Cited

U.S. PATENT DOCUMENTS

| D. 320,197 | 9/1991 | Weber . | |
|---|---|---|---|
| 5,049,863 | 9/1991 | Oka | 340/710 |
| 5,063,376 | 11/1991 | Chang . | |
| 5,122,785 | 6/1992 | Cooper | 345/123 |
| 5,157,381 | 10/1992 | Cheng | 340/710 |
| 5,164,713 | 11/1992 | Bain | 340/710 |
| 5,195,894 | 3/1993 | LeBlanc et al. | 434/114 |
| 5,250,929 | 10/1993 | Hoffman et al. . | |
| 5,268,674 | 12/1993 | Howard et al. | 345/163 |
| 5,280,276 | 1/1994 | Kwok | 345/167 |
| 5,287,090 | 2/1994 | Grant | 345/163 |
| 5,296,871 | 3/1994 | Paley | 345/163 |

FOREIGN PATENT DOCUMENTS

602840A1 12/1993 European Pat. Off. .......... 370/434

Primary Examiner—Richard Hjerpe
Assistant Examiner—Juliana S. Kim
Attorney, Agent, or Firm—Christopher N. Malvone

[57] ABSTRACT

An icon positioning device with a keypad, telephone circuit, speaker and microphone is used as part of an interface system to a computer and a telephone network. The icon positioning device is used to control a position of an icon on the computer's display. The keypad on the positioning device is used to enter information into the computer and to control communication over a telephone network. In addition, the computer displays icons that are representative of the keys composing the positioning device's keypad. When one of the keys is activated, the corresponding icon on the computer's display changes appearance. Thus, the positioning device serves as a multi-featured control apparatus, as a pointing device, and as a telephone.

25 Claims, 3 Drawing Sheets

COMPUTING AND TELECOMMUNICATIONS INTERFACE SYSTEM

This application is related to commonly assigned and concurrently filed U.S. patent application 08/339,387 filed Nov. 14, 1994, entitled "Computing Interface System".

BACKGROUND OF THE INVENTION

1. Field of the Invention

The present invention relates to computers and communications; more specifically, a system for interfacing to a computer and to a telephone network.

2. Description of the Related Art

In the past, a typical desktop included a telephone and a computer where the computer was controlled using a mouse. These pieces of equipment occupied a large mount of limited desktop space, and thereby created a cluttered environment which made it more difficult to perform tasks efficiently.

BACKGROUND OF THE INVENTION

An embodiment of the present invention decreases the clutter on a desktop by providing an icon positioning device that can be used to interface to a computer as well as to a telephone network. Using the disclosed icon positioning device permits removing the telephone from the desktop and thereby creates additional workspace.

Another embodiment of the present invention comprises a mouse with a keypad, microphone and speaker. When communicating with the computer, the mouse may be used in a typical point and click mode, or a keypad mode. When used to interface a telephone network, the keypad is used to enter a telephone number, and the speaker and microphone are used to communicate over a telephone network. To facilitate use, the mouse may have wireless connections to both the computer and telephone network.

Yet another embodiment of the present invention comprises an icon positioning device with a keypad microphone and speaker. The positioning device is used to position an icon on a computer's display and to enter data into the computer using the keypad. The computer's display includes a group of icons that have a one-to-one correspondence to the keys composing the keypad, where the icons have the same relative positioning as the keys composing the keypad.

DETAILED DESCRIPTION OF THE INVENTION

Figure 1:
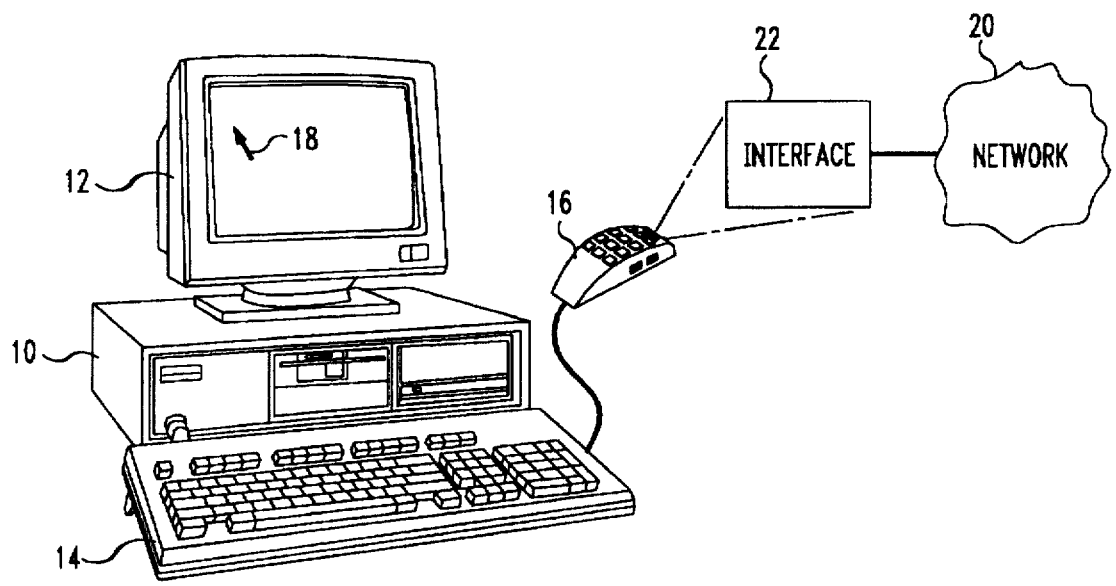
FIG. 1 illustrates a computer, mouse and telephone network.

FIG. 1 illustrates computer 10 which communicates with display 12 and keyboard 14. Mouse 16 is used to control the position of an icon that is displayed on display 12, to enter numerical data into computer 10 and to communicate using telephone network 20 through telephone network interface 22. In this embodiment, mouse 16 communicates with computer 10 using a conductor and with telephone network interface 22 using infrared signals.

Figure 2:
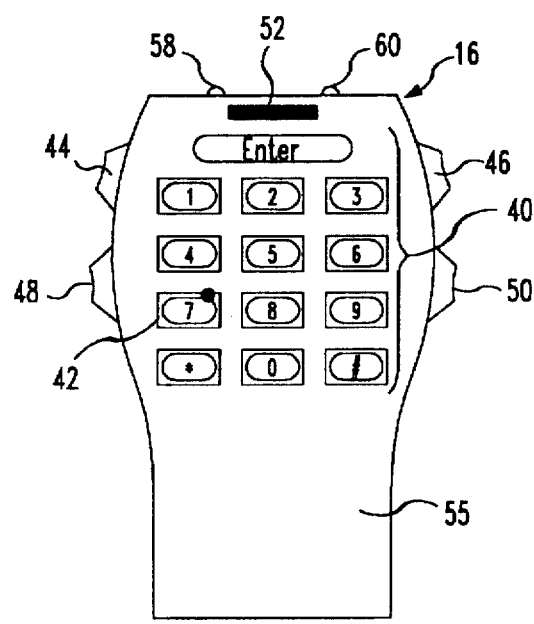
FIG. 2 is a top view of a multifunctional mouse.
Figure 3:
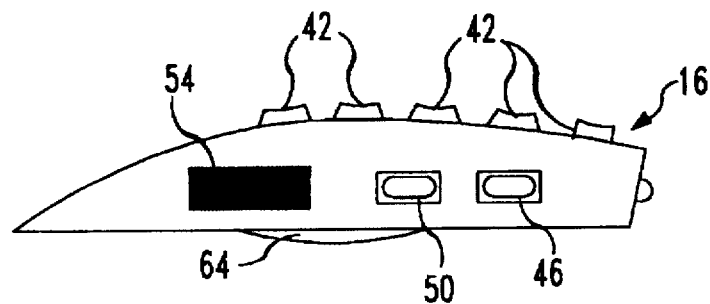
FIG. 3 is a side view of a multifunctional mouse.

FIGS. 2 and 3 are top and side views, respectively, of multifunctional mouse 16. The top surface of multifunctional mouse 16 includes keypad 40 which is composed of user activated switches or keys 42. The keys can be numbered in any particular order; however, it is desirable to have an arrangement of keys 42 similar to that of a typical telephone.

Keys 44 and 46 are used to indicate to computer 10 to change the way in which it interprets the activation of keys 42. Computer 10 interprets the activation of switches 42 in two ways depending on the way in which mouse 16 is to be used. If mouse 16 is to be used in a keypad mode, switches 42 are interpreted as a keypad, that is, the activation of keys labeled "1", "2", "3", etc. are interpreted as the digits 1, 2, 3, etc., respectively. If mouse 16 is to be used in a conventional point and click mode, switches 42 are interpreted in the same manner as a conventional mouse, that is, the activation of keys labeled "1", "2" and "3" are interpreted as the left, center and right buttons, respectively, of a conventional mouse. In the point and click mode, the remaining keys of keypad 40 are ignored by computer 10. When mouse 16 is used in the conventional mode, and keys 44 and 46 are pressed simultaneously, computer 10 changes the way in which it interprets keys 42 so that mouse 16 may be used in the keypad mode. When keys 44 and 46 are pressed simultaneously again, computer 10 changes the way in which it interprets keys 42 so that mouse 16 may be used in a conventional point and click mode. It is also possible to switch between the keypad and conventional modes using a single key; however, using two keys helps to prevent accidental switching between modes.

Switches 48 and 50 are used when a user desires to communicate over telephone network 20. Switches or keys 48 and 50 are used to switch from an off-hook to an on-hook condition, or from an on-hook to an off-hook condition. A user switches between off-hook and on-hook conditions by simultaneously pressing keys 48 and 50. For example, to begin a telephone conversation, a user presses keys 48 and 50 to create an off-hook condition and to obtain a dial tone. When a user desires to end a telephone conversation, an on-hook condition is created by once again simultaneously pressing keys 48 and 50. It is also possible to control on-hook and off-hook conditions using only a single key; however, using two keys helps to prevent accidental switching between on-hook and off-hook conditions. A user's voice is transmitted to the telephone network using microphone 52. Microphone 52 is on the top surface of mouse 16; however, the microphone may be placed in any location that permits reception of the user's voice. Speakers 54 are located on the sides of mouse 16. It is also possible to locate one larger speaker on top surface 55 of mouse 16.

Mouse 16 may communicate with computer 10 and network 20 using wired communication links, or wireless communication links. In a wireless embodiment, infrared light emitting diodes (LEDs) may be used for communication; however, it is also possible to use radio frequency communications. In a wireless infrared embodiment, LED 58 is used to communicate with an infrared receiver in computer 10, and LED 60 is used to communicate with an infrared receiver in telephone network interface 22. In order to minimize interference between the communication channels, LEDs 58 and 60 produce different wavelengths of infrared light. For example, LED 58 uses a wavelength to which the receiver in computer 10 is sensitive and the receiver in network interface 22 is insensitive, and LED 60 uses a wavelength to which the receiver in telephone network interface 22 is sensitive and the receiver in computer 10 is insensitive. It is also possible to distinguish between the two communication channels (i.e., the communication channel between the mouse and the computer, and the communication channel between the mouse and telephone network interface) by using coding schemes that permit using the same wavelength for communications with both computer 10 and telephone network interface 22. Using a coding scheme makes it possible to use a single light emitting diode for communications. It is also possible to use a wire or conductor to communicate between mouse 16 and computer 10, and/or between mouse 16 and telephone network interface 22. If a wire is to be used, it is desirable to use a wire for communications between mouse 16 and computer 10 while maintaining a wireless communication channel between mouse 16 and telephone network interface 22.

In reference to FIG. 3, mouse 16 contains ball 64 which is used to sense the motion of the mouse as it is moved across a surface. It is also possible for ball 64 to extend through the top surface of the mouse rather than the lower surface of the mouse. This will enable the mouse to be used as a track ball device in which the user rotates the ball to position an icon in a desirable location on display 12. The track ball embodiment of the invention offers the advantage of controlling the icon on display 12 without moving mouse 16 and thereby saves additional desktop space.

Figure 4:
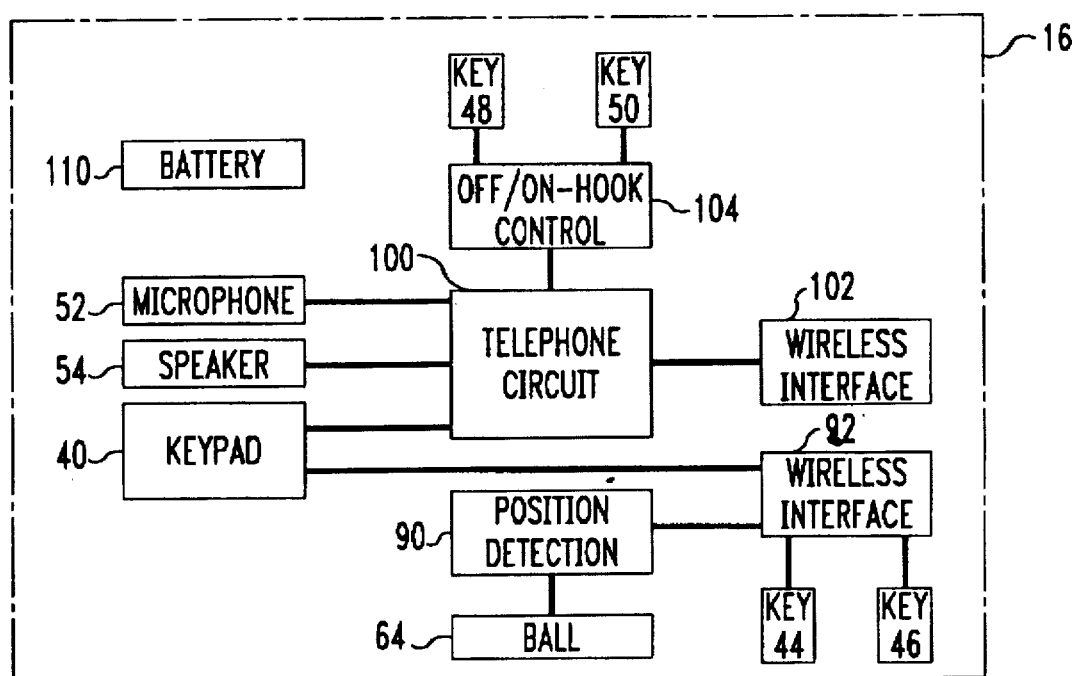
FIG. 4 is a block diagram of a multifunctional mouse.

FIG. 4 is a block diagram of multifunctional mouse 16. Position detection circuitry 90 monitors the motion of ball 64 to produce signals that computer 10 uses to control the position of an icon, such as a pointing icon, on display 12. Position detection circuitry is well-known in the art and uses, for example, rollers in contact with ball 64 so that the rollers rotate when ball 64 rotates as mouse 16 is moved along a surface. The rollers are positioned 90 degrees apart along the circumference of ball 64 so that one roller can detect rotation resulting from moving mouse 16 in the X direction, and the other roller can detect rotation resulting from moving mouse 16 in the Y direction. Each of the rollers is attached to a shaft that rotates a slotted disk, where the shafts are mounted at fight angles to each other. The slotted disk interrupts a light beam between a light emitting diode and a photo transistor to create a signal indicative of ball 64's rotation. Computer 10 uses these signals to monitor the X and Y movements of mouse 16 and positions an icon on display 12 in a conventional manner in response to the movements of mouse 16. In the case of a wireless connection between mouse 16 and computer 10, wireless interface 92 converts signals from position detection circuitry 90 into radio frequency or infrared signals that are received by a corresponding receiver in computer 10. These interfaces are well-known in the art and may be similar to, for example, a conventional infrared remote control interface used on a wireless mouse.

Keypad 40, and keys 44 and 46 also communicate with computer 10, and when a wireless interface is used, they communicate via wireless interface 92. When a key is pressed, the identity of that key is passed to computer 10 in a conventional fashion. As mentioned earlier, when both keys 44 and 46 are pressed nearly simultaneously, computer 10 changes the way in which it interprets the inputs from mouse 16. In reference to FIG. 5, it is also possible to instruct computer 10 to interpret the inputs from mouse 16 as keypad inputs rather than conventional mouse inputs by positioning pointing icon 97, which is controlled by mouse 16, into predefined location 98 on display 12. When the icon is positioned within this location on display 12, inputs from mouse 16 are interpreted as keypad inputs rather than simple click and point inputs. It is also possible to control the way in which computer 10 interprets inputs from mouse 16 based on which software application is being executed by the computer.

Keypad 40 is also connected to conventional telephone circuitry 100. Telephone circuitry 100 receives inputs from keypad 40 and microphone 52, and provides an output to speaker 54. Telephone circuitry 100 is well-known in the art and may be used to interface to telephone network 20, in a conventional wired manner using "tip" and "ring" lines. When it is desirable to have a wireless connection between mouse 16 and telephone network 20, wireless interface 102 is used. Wireless interface 102 may be a conventional radio frequency interface such as those used in cordless telephones or it may be an infrared communication interface similar to those used in infrared remote control systems. If a wireless interface is used, the appropriate receiver is used as telephone network interface 22. For example, interface 22 may be similar to a conventional cordless telephone base station when radio frequency communications are used, and interface 22 may be similar to a conventional infrared receiver when infrared communications are used. In addition, telephone circuitry 100 receives inputs from switches 48 and 50 via control 104. As discussed earlier, if an on-hook condition exists, pressing keys 48 and 50 nearly simultaneously will create an off-hook condition. If an off-hook condition exists, pressing keys 48 and 50 nearly simultaneously creates an on-hook condition. Control 104 indicates an off-hook or an on-hook condition to telephone circuitry 100. Control 104 may be implemented using an appropriately programmed microprocessor, or a simple state machine that switches between one of two states when inputs from keys 48 and 50 are detected.

When mouse 16 uses a conductor to communicate with computer 10, electrical power can be provided to mouse 16 via the conductor. If mouse 16 is used in a wireless configuration, battery 110 is used to provide electrical power to the circuitry located in mouse 16. When mouse 16 is used with wireless communications, it is desirable to have a "nest" that is used to charge battery 110 when the mouse is not in use.

Figure 5:
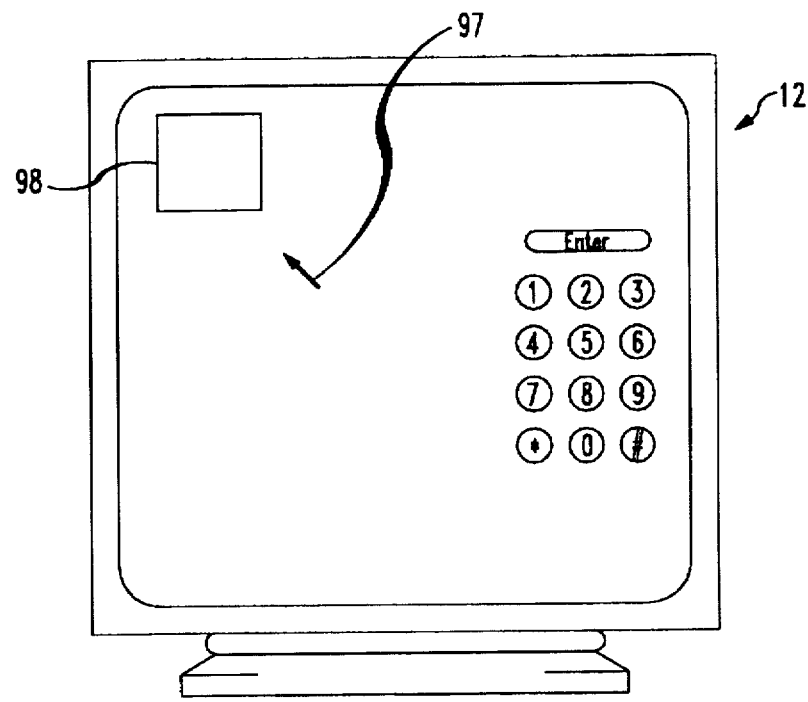
FIG. 5 illustrates a display screen.

In reference to FIG. 5, it is desirable to display on display 12 a plurality of icons representative of keypad 40. In accordance with one of the principles of this invention, the icons are positioned in a manner that is representative of the arrangement of the keys composing keypad 40. This will enable the user to look at display 12 while operating the keys of keypad 40 on mouse 16. The icons representing the keys change appearance when the corresponding key is pressed on mouse 16 to indicate to the user that computer 10 has received a signal indicative of a key being pressed. This provides the user with visual feedback to indicate that the information is being received by computer 10 and also provides the advantage of permitting the user to use keypad 40 without looking back and forth between display 12 and mouse 16. It is also desirable to provide a display that matches the number, identity and configuration of the keys composing keypad 40; this also enables the user to stay oriented with respect to the position of the keys on mouse 16 without repeatedly looking back and forth between display 12 and mouse 16. For example, the icons may have a one-to-one correspondence to the keys composing keypad 40.

Figure 6:
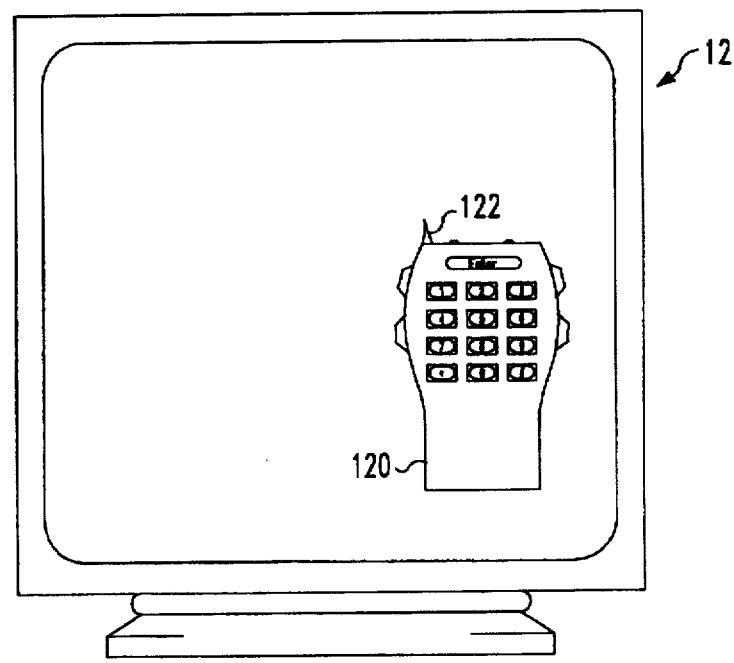
FIG. 6 illustrates a single icon with multiple active regions.

FIG. 6 illustrates single icon 120 which is representative of mouse 16. Icon 120 may be movable in a manner similar to that of a conventional pointing icon, where segment 122 is used as the pointing portion of the icon. If icon 120 is not movable, a conventional pointing icon may be used in addition to icon 120 for providing inputs to the computer. It is desirable for icon 120 to be relatively small with respect to the display screen in order to minimize the display area covered by the icon. Icon 120 includes several active regions that change appearance when the corresponding key of mouse 16 is activated. In this embodiment, active regions are provided for the keys composing keypad 40 and for keys 44, 46, 52 and 54. It is possible to omit active regions corresponding to some or all of keys 44, 46, 52 and 54; however, it is desirable to include an active region corresponding to each key. The additional active regions facilitate keeping the user oriented with respect to the position of the keys on mouse 16 without repeatedly looking back and forth between display 12 and mouse 16.

It should be noted that it is possible to position speaker 50 or microphone 48 in other locations such as in or on computer 10. In this situation, signals between telephone circuitry 100, and the microphone and speaker may be carried over the interface between mouse 16 and computer 10. By placing the speaker and microphone in computer 10, it is possible to reduce the size of mouse 16; however, it may be more desirable to have the speaker and microphone in mouse 16 because of the mobility of mouse 16.

It is also possible to position telephone circuitry 100 within computer 10. In this embodiment, information from keyboard 40 is passed to computer 10 for use by telephone circuitry 100. When the speaker, microphone and telephone circuitry are located in computer 10, telephone circuitry 100 communicates directly with the microphone and speaker. When the speaker and/or microphone are located in mouse 16 and the telephone circuitry is located in computer 10, telephone circuitry 100 communicates with the speaker and/or microphone over the communication channel between computer 10 and mouse 16. Placing telephone circuitry 100 in computer 10 offers the advantage of decreasing the number of communication channels to mouse 16 by eliminating the need for a communication channel that connects directly between mouse 16 and interface 22. In this embodiment, telephone circuitry 100 communicates with interface 22 via a communication channel between computer 10 and interface 22.

What is claimed:

1. A computer interface system including a computer having display means and computing means, comprising:
    positioning means for controlling a position icon on said display means by selective movement of said positioning means about a support surface, said positioning means having a microphone, a plurality of user-activated switches and a plurality of user-activated mode setting switches;
    means for communicating to said computing means signals from said positioning means and signals from said user-activated switches;
    means for coupling said microphone to a telephone network; and
    means for switching the computer interface system between a first function mode and a second function mode being different from the first function mode and operative to switch between the first function mode and the second function mode when the plurality of user-activated mode setting switches are simultaneously activated.

2. The interface system of claim 1, wherein said pointing icon includes a display of positions, corresponding to the position of at least some of the switches present in said positioning means.

3. The computer interface system of claim 1, wherein said computing means interprets said plurality of user-activated switches in the first function mode prior to activation of said switching means, and in the second function mode following the activation of said switching means, said switching means containing at least one of said user-activated switches.

4. The computer interface system of claim 3, wherein the first function mode is one of a keypad mode and a conventional point-and-click mode and the second function mode is a remaining one of the keypad mode and the conventional point-and-click mode.

5. The computer interface system of claim 1, wherein said display means displays a plurality of icons representing said plurality of user-activated switches, said plurality of icons having a positioning relative to each other that is representative of a positioning of said plurality of user-activated switches relative to each other, and one of said plurality of icons changing appearance when a corresponding one of said plurality of user-activated switches is activated.

6. The computer interface system of claim 1, wherein said icon positioning means further comprises a speaker and means for coupling the speaker to the telephone network.

7. The computer interface system of claim 1, wherein said computing means includes a speaker and means for coupling the speaker to the telephone network.

8. The computer interface system of claim 1, wherein said computing means communicates with said icon positioning means using a conductor.

9. The computer interface system of claim 1, wherein said computing means communicates with said icon positioning means using electromagnetic energy.

10. The computer interface system of claim 9, wherein said icon positioning means further comprises a battery.

11. A computer interface system, comprising:
    positioning means for controlling a position of an icon by selective movement of said positioning means about a support surface, said positioning means having a microphone, a communication link to a telephone network, a plurality of user-activated switches and a plurality of user-activated mode setting switches;
    means for switching the computer interface system between a first function mode and a second function mode being different from the first function mode and operative to switch between the first function mode and the second function mode when the plurality of user-activated mode setting switches are simultaneously activated;
    display means for displaying said icon; and
    computing means for executing programs, said computing means being in communication with said positioning means and said display means.

12. The computer interface system of claim 11 wherein said computing means interprets said plurality of user-activated switches in the first function mode prior to activation of said switch means and in the second function mode following activation of said switch means, said switching means being positioned on said positioning means.

13. The computer interface system of claim 11, wherein said display means displays a plurality of icons representing said plurality of user-activated switches, said plurality of icons having a positioning relative to each other that is representative of a positioning of said plurality of user-activated switches relative to each other, and one of said plurality of icons changing appearance when a corresponding one of said plurality of user-activated switches is activated.

14. The computer interface system of claim 11, wherein said positioning means comprises a speaker.

15. The computer interface system of claim 11, wherein said computing means comprises a speaker.

16. The computer interface system of claim 11, wherein said computing means communicates with said positioning means using a conductor.

17. The computer interface system of claim 11, wherein said computing means communicates with said positioning means using electromagnetic energy.

18. The computer interface system of claim 17 wherein said positioning means comprises a battery.

19. The computer interface system of claim 11, wherein the first function mode is one of a keypad mode and a conventional point-and-click mode and the second function mode is a remaining one of the keypad mode and the conventional point-and-click mode.

20. A computer interface system, comprising:
   positioning means for controlling a position of an icon by selective movement of said positioning means about a support surface, said positioning means having a microphone, a speaker, a plurality of user-activated switches, a plurality of user-activated mode setting switches and a first user-activated switch that causes switching between an on-hook condition and an off-hook condition regardless of the position of the icon;
   means for switching the computer interface system between a first function mode and a second function mode being different from the first function mode and operative to switch between the first function mode and the second function mode when the plurality of user-activated mode setting switches are simultaneously activated;
   display means for displaying said icon and a plurality of icons representing said plurality of user-activated switches, said plurality of icons having a positioning relative to each other that corresponds to a positioning of said plurality of user-activated switches relative to each other, and one of said plurality of icons changing appearance when a corresponding one of said plurality of user-activated switches is activated; and
   computing means for executing programs, said computing means in communication with said positioning means, said display means and a telephone network.

21. The computer interface system of claim 20, wherein said computing means interprets said plurality of user-activated switches in a first mode prior to a second user-activated switch being activated and in a second mode after said second user-activated switch is activated, said second user-activated switch being positioned on said positioning means.

22. A computer interface device adapted for selective movement about a support surface, comprising:
   positioning means for controlling a position icon on said display means by selective movement of said positioning means about a support surface, said positioning means having a microphone, a plurality of user-activated switches and a plurality of user-activated mode setting switches;
   means for switching the computer interface system between a first function mode and a second function mode being different from the first function mode and operative to switch between the first function mode and the second function mode when the plurality of user-activated mode setting switches are simultaneously activated;
   means for informing a computer of changes in the position of the computer interface device;
   means for signaling the computer status of switches accessible at the computer interface device; and
   a telephone adapted for connection to a telephone network.

23. A multifunctional positioning apparatus adapted for use with a computer with a display, the computer operatively connected to a telephone network, comprising:
   positioning means for controlling a position of a pointing icon on the display, said positioning means including a microphone, an array of user-activated switch elements, said array of user-activated switch elements operative in at least a first function mode and a second function mode different from said first function mode, and a plurality of user-activated mode setting switches;
   means for switching the computer interface system between the first function mode and the second function mode and operative to switch between the first function mode and the second function mode when the plurality of user-activated mode setting switches are simultaneously activated;
   means for communicating to the computer signals from said positioning means and signals from said array of user-activated switch elements; and
   means for coupling said microphone and said array of user-activated switch elements to the telephone network when said array of user-activated switch elements is operative in at least one of said first and second function modes.

24. A multifunctional positioning apparatus according to claim 23, further comprising switching means for switching said array of user-activated switch elements between the first and second function modes.

25. A multifunctional positioning apparatus according to claim 23, wherein said array of user-activated switch elements is operative as a telephone dialing pad in one of said first and second function modes.

* * * * *